June 15, 1954    M. C. TEVES ET AL    2,681,420
X-RAY IMAGE-INTENSIFYING TUBE
Filed Aug. 15, 1952
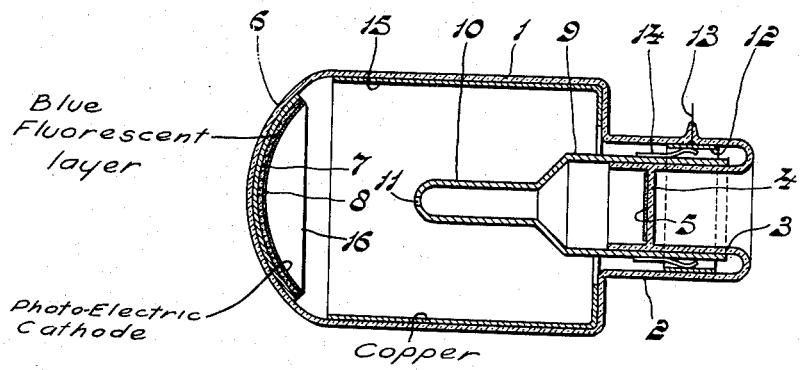
INVENTORS
MARTEN CORNELIS TEVES
TAEKE TOL
BY
AGENT

Patented June 15, 1954

2,681,420

UNITED STATES PATENT OFFICE 2,681,420

X-RAY IMAGE-INTENSIFYING TUBE

Marten Cornelis Teves and Taeke Tol, Eindhoven, Netherlands, assignors to Hartford National Bank and Trust Company, Hartford, Conn., as trustee Application August 15, 1952, Serial No. 304,538

Claims priority, application Netherlands September 27, 1951

3 Claims. (Cl. 313—65)

This invention relates to an image-intensifying tube for intensifying an X-ray image.

Image-intensifying tubes generally comprise a screen on which an X-ray image impinges, which screen converts the X-ray image into an electron image which is then projected electron-optically onto a luminescent or viewing screen. The first screen usually consists of two layers, one of which is a luminescent layer which converts the X-radiation into radiations in the blue or near-blue region of the visible spectrum (4500 Å.), and the other of which is a photo-electric cathode which will emit electrons upon excitation by blue light. For maximum efficiency, the thickness of the photo-electric cathode is made equal to about 70 to 80% of the depth of penetration of blue light therein. Consequently, about 20% of the blue light is transmitted by the cathode into the interior of the tube. This stray light is quite troublesome when operating the tube since it is reflected back to the photo-cathode and causes the emission of electrons which are not associated with the X-ray image.

It is an object of the invention to provide an image-intensifying tube in which the stray light transmitted by the cathode is reduced.

It is a further object of the invention to provide an image-intensifying tube with a low-reflecting surface adjacent the cathode.

It is still a further object of the invention to provide an image-intensifying tube with a low-reflecting metal surface by evaporation in a vacuum.

These and other objects of the invention will be best understood from the following description.

According to the invention, an image-intensifying tube comprises an envelope enclosing a double-layer screen for converting an X-ray image into an electron image and electron-optical means for projecting the electron image onto a luminescent viewing screen. The double-layer screen comprises an X-ray responsive luminescent layer arranged to radiate rays primarily in the blue region of the visible spectrum having a maximum wavelength of about 4500 Å. and a photo-electric cathode responsive to such blue rays. The tube is further provided with a layer of a metal on the envelope having the property of being substantially non-reflective to radiation in the blue region, i. e. having a high absorption coefficient for radiation in the blue region.

The invention is based on the discovery that certain metals reflect relatively small quantities of radiation in a given wavelength. In particular, it has been found that, for example, one of the metals, silver, gold or copper, reflect very little radiation in the blue region, so that if one of these metals is coated on the portion of the tube envelope between the photo-cathode and the viewing screen, about 90% of the light transmitted by the photo-cathode is not reflected back thereto, provided that this light lies in the blue region of the visible spectrum. Furthermore, the use of one of these three metals is particularly advantageous because they may be easily applied to the envelope as a thin layer by evaporation in a vacuum. Another advantage of these three metals is that they have little or no affinity for cesium, which substance is usually included in the photo-cathode.

According to a further aspect of the invention, the surface of the envelope upon which the non-reflecting layer is to be provided, is first given a very smooth satiny surface before the metal is precipitated on the wall. The resultant dull surface provided on the wall helps to prevent formation of a reflecting layer when the metal is placed on the wall. Furthermore, the smooth surface provided by the satiny finish completely diffuses the small quantity of light impinging thereupon, so that the light reflected back to the cathode is distributed uniformly throughout the surface.

The metal coating, which is preferably of copper, may be applied to the tube envelope by the conventional method of cathode-evaporation in a vacuum in which a glow helix carrying a quantity of the metal to be precipitated is introduced into the tube. The helix is heated and the metal evaporates off and precipitates on the surrounding surfaces. The photo-cathode and viewing screen are usually screened during the evaporation of the metal to prevent metal from depositing thereon, and, afterwards, the screening is removed from the tube.

The invention will now be described with reference to the accompanying drawing in which the sole figure shows an image-intensifying tube according to the invention.

The glass wall 1 of the evacuated tube has a narrowed part 2 comprising a reentrant portion 3. This portion is closed by a viewing screen constituted by a transverse wall 4 which is coated on its inner side with a film 5 of a substance which fluoresces on being struck by electrons.

The arcuate front part 6 of the tube wall, which serves as a transparent window through which the X-rays pass, contains on its hollow side the photo-electric layer. Provision is made of a layer 7 of a substance which under the influence of X-rays fluoresces in the blue or near-blue region of the visible spectrum. The light of this primary luminescent screen causes the photo-electric layer 8, which is arranged to coat the layer 7 with a current supplying substratum, to emit electrons. For the sake of clarity it was necessary to exaggerate on the drawing the thickness of the layer shown.

A metal cylinder 9 is arranged to grip the re-entrant portion 3. Its part adjacent the cathode is narrowed and ends in a thimble-shaped top 10 which constitutes the anode of the tube. This top has formed in it a circular bore 11 for the passage of electrons from the photo-cathode to the luminescent screen 5.

The narrowed part 2 of the tube wall is provided on the inner side with an annular coating 12 of silver or other conductive material and a wire 13 sealed in the wall of the part 2 makes contact therewith. The cylinder 9 is provided externally with contact springs 14 which engage the coating 12.

The inner surface of the wall 1 is coated with a conductive layer 15 of metal which reflects relatively small quantities of radiation transmitted by the photo-cathode into the interior of the tube. The layer 15 extends from slightly beyond the marginal surface 16 of the cathode towards the anode side of the tube as far as almost the narrowed part 2.

Luminescent substances suitable for use as the first layer of the double-layered screen, i. e. the layer that converts the X-rays into light primarily in the blue region of the visible spectrum, are zinc sulphide activated by silver, zinc-cadmium sulphide and barium-lead sulphide. The other layer of the double-layered screen, i. e. the photo-cathode, preferably consists of cesium-antimony.

While we have thus described our invention with specified examples and embodiments thereof, other modification will be readily apparent to those skilled in the art without departing from the spirit and the scope of the invention as defined in the appended claims.

What we claim is:

1. An X-ray image-intensifying tube comprising an envelope having a satiny finish on an inner wall portion, a radiation-transparent window in said envelope, a double-layer radiation-responsive screen disposed adjacent said window in said envelope for producing an electron image corresponding to an X-ray image impinging thereupon, said radiation-responsive screen comprising an X-ray responsive luminescent layer which emits rays having a maximum wavelength of about 4500 Å. and a photo-cathode responsive to said rays having a thickness about 70 to 80% of the depth of penetration of said rays in said photo-cathode, a viewing screen disposed within the envelope for converting the electron image into a visible image, electron-optical means for projecting the electron image onto the viewing screen, and a thin layer of copper on said satiny portion of said envelope for absorbing the radiation transmitted through said cathode into said tube.

2. An X-ray image-intensifying tube comprising an envelope, a radiation-transparent window in said envelope, a double-layer radiation-responsive screen disposed adjacent said window in said envelope for producing an electron image corresponding to an X-ray image impinging thereupon, said radiation-responsive screen comprising an X-ray responsive luminescent layer which emits rays having a maximum wavelength of about 4500 Å. and a photo-cathode responsive to said rays having a thickness about 70 to 80% of the depth of penetration of said rays in said photo-cathode, a viewing screen disposed within the envelope for converting the electron image into a visible image, electron-optical means for projecting the electron image onto the viewing screen, and a thin layer of copper on a substantial portion of the inner surface of said envelope for absorbing the radiation transmitted through said cathode into said tube.

3. An X-ray image-intensifying tube comprising an envelope, a radiation-transparent window in said envelope, a double-layer radiation-responsive screen disposed adjacent said window in said envelope for producing an electron image corresponding to an X-ray image impinging thereupon, said radiation-responsive screen comprising an X-ray responsive luminescent layer which emits rays having a maximum wavelength of about 4500 Å. and a photo-cathode responsive to said rays having a thickness which is less than the depth of penetration of said rays in said photo-cathode, a viewing screen disposed within the envelope for converting the electron image into a visible image, electron-optical means for projecting the electron image onto the viewing screen, and a thin layer of copper on a portion of the inner surface of said envelope for absorbing the radiation transmitted through said cathode into said tube.

References Cited in the file of this patent

UNITED STATES PATENTS

| Number | Name | Date |
|---|---|---|
| 1,988,469 | Zworykin et al. | Jan. 22, 1935 |
| 2,090,922 | Von Ardenne | Aug. 24, 1937 |
| 2,151,785 | Lubszynski et al. | Mar. 28, 1939 |
| 2,523,132 | Mason et al. | Sept. 19, 1950 |